(12) United States Patent
Zhang et al.

(10) Patent No.: US 11,316,598 B2
(45) Date of Patent: Apr. 26, 2022

(54) METHOD AND APPARATUS FOR LOW POWER SYNCHRONIZATION OF BLUETOOTH SYSTEMS

(71) Applicant: Intel IP Corporation, Santa Clara, CA (US)

(72) Inventors: Yuwei Zhang, Pleasanton, CA (US); Prasanna Desai, Elfin Forest, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/646,440

(22) PCT Filed: Dec. 28, 2017

(86) PCT No.: PCT/US2017/068732
§ 371 (c)(1),
(2) Date: Mar. 11, 2020

(87) PCT Pub. No.: WO2019/132922
PCT Pub. Date: Jul. 4, 2019

(65) Prior Publication Data
US 2020/0322070 A1 Oct. 8, 2020

(51) Int. Cl.
*H04B 17/309* (2015.01)
*H04L 25/02* (2006.01)
*H04L 27/156* (2006.01)

(52) U.S. Cl.
CPC ........ *H04B 17/309* (2015.01); *H04L 25/024* (2013.01); *H04L 25/0212* (2013.01); *H04L 25/0224* (2013.01); *H04L 25/0262* (2013.01); *H04L 27/156* (2013.01)

(58) Field of Classification Search
CPC .................... H04B 17/309; H04L 25/0212
See application file for complete search history.

(56) References Cited

U.S. PATENT DOCUMENTS 8,553,786 B2* 10/2013 Dick ............... H04L 27/262
375/260
2002/0085531 A1 7/2002 Herrmann et al.
(Continued)

FOREIGN PATENT DOCUMENTS

KR 20040110341 A * 12/2004

OTHER PUBLICATIONS

U.S. International Searching Authority, PCT International Search Report issued for PCT/US2017/068732, 3 pgs., dated Apr. 25, 2018.

*Primary Examiner* — Zhiren Qin
(74) *Attorney, Agent, or Firm* — Banner Witcoff, Ltd.

(57) ABSTRACT

A method and apparatus for synchronizing a wireless communication receiver such as a Bluetooth receiver, including estimating the condition of the communication channel and operating the receiver either in frequency domain mode or in time domain mode based on the channel condition estimation. A soft threshold is used to estimate the symbols of the access address code. Oversampled data rate received data is processed at symbol rate of the data. Receiver functions are terminated upon determining that no signal that the receiver can decode is being received. Synchronization includes a correlator that processes an entire address code or a correlator that processes the address code in segments.

16 Claims, 9 Drawing Sheets

(56) References Cited

U.S. PATENT DOCUMENTS

| | | | |
|---|---|---|---|
| 2005/0036074 A1* | 2/2005 | Nhu | H04N 5/46 |
| | | | 348/738 |
| 2006/0109919 A1 | 5/2006 | Nieto | |
| 2009/0028228 A1* | 1/2009 | Wang | H04B 17/318 |
| | | | 375/224 |
| 2010/0008443 A1 | 1/2010 | Casamajou | |
| 2013/0107782 A1 | 5/2013 | Anas et al. | |
| 2016/0315694 A1* | 10/2016 | Maiya | H04W 56/005 |

* cited by examiner

METHOD AND APPARATUS FOR LOW POWER SYNCHRONIZATION OF BLUETOOTH SYSTEMS

TECHNICAL FIELD

The present disclosure relates generally to a method and apparatus for synchronizing communication systems, and more particularly to a method and apparatus for synchronizing wireless communications systems using Bluetooth technology.

BACKGROUND

Bluetooth wireless technology has become widely used for many practical applications, in part due to its ability to provide wireless communications between electronic devices at low power consumption. Bluetooth systems can be divided into classic Bluetooth technology systems, which includes a basic rate mode and an enhanced data rate mode, and low energy Bluetooth (BLE=Bluetooth Low Energy) technology systems which includes conventional BLE and coded BLE (also called long range BLE).

Figure 1:
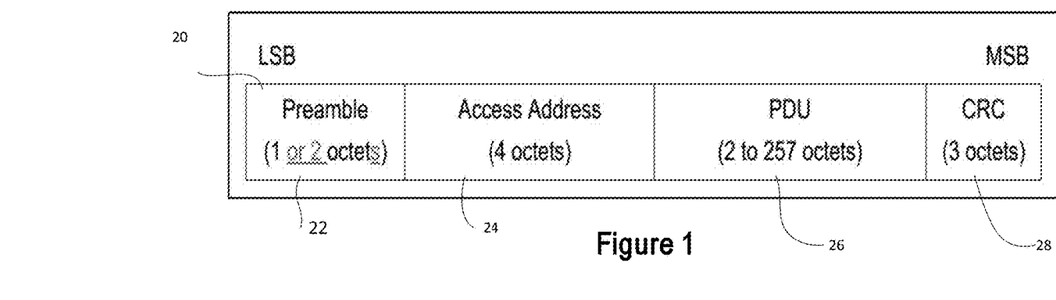
FIG. 1 is a schematic diagram of a packet format as used in a Bluetooth Low Energy (BLE) wireless communication system.
Figure 2:
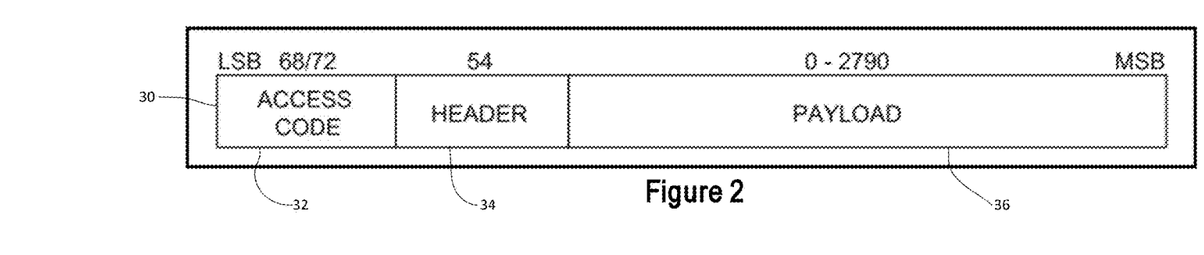
FIG. 2 is a schematic diagram of a packet format for a Bluetooth general basic rate packet.
Figure 3:
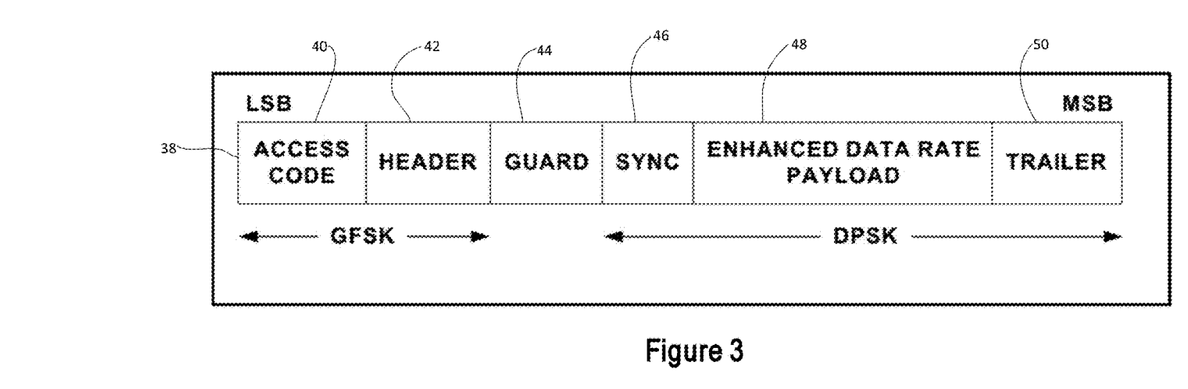
FIG. 3 is a schematic diagram of a packet format for a Bluetooth general enhanced data rate packet.

Bluetooth technology provides radio frequency wireless communications of information encoded into packets of data. The basic packet formats at the physical layer for conventional BLE (Bluetooth Low Energy) and classic Bluetooth systems are showed in FIG. 1, FIG. 2 and FIG. 3. FIG. 1 shows a packet format 20 for a Bluetooth Low Energy system including a preamble 22 of one or two octets, an access address code (ACC) 24 of four octets, a PDU (packet data unit) 26 of between 2 to 257 octets, and a CRC (cyclic redundancy code) 28 of three octets, considered from the LSB (least significant bit) to the MSB (most significant bit). FIG. 2 shows the packet format for a general basic rate packet 30. The packet 30 includes an access address code 32 of 68 or 72 bits, a header 34 of 54 bits, and a payload 36 of zero to 2790 bits from least significant bit to most significant bit. FIG. 3 shows a general enhanced data rate packet 38 having an access address code 40, a header 42, a guard portion 44, a sync portion 46, an enhanced data rate payload 48, and a trailer 50. The less significant bits of the packet 38 use GFSK (Gaussian frequency shift keying) and the more significant bits use DPSK (differential phase shift keying), as indicated.

To receive user data, a Bluetooth receiver first has to identify an access address code (AAC), which may be referred to as synchronization of the receivers of the communicating devices. The access address code AAC is modulated using 2GFSK (Binary Gaussian Frequency Shift Keying) modulation with a modulation index of between 0.28 and 0.35 for the classic Bluetooth technology and with a modulation index of between 0.45 and 0.55 for Bluetooth low energy (BLE) technology.

For 2GFSK modulation, there are two types of receiver structures: a time-domain receiver and a frequency-domain receiver. Normally, the time-domain receiver can provide a better receiving performance due to the higher complexity of the time-domain receiver compared to a frequency-domain receiver. The synchronization performance boundary or limits for the two receiver types can be determined. In an example of a Bluetooth Low Energy (BLE) receiver using a modulation index of 0.5, the performance of the receiver has been graphed for different receiver types in FIG. 4.

Figure 4:
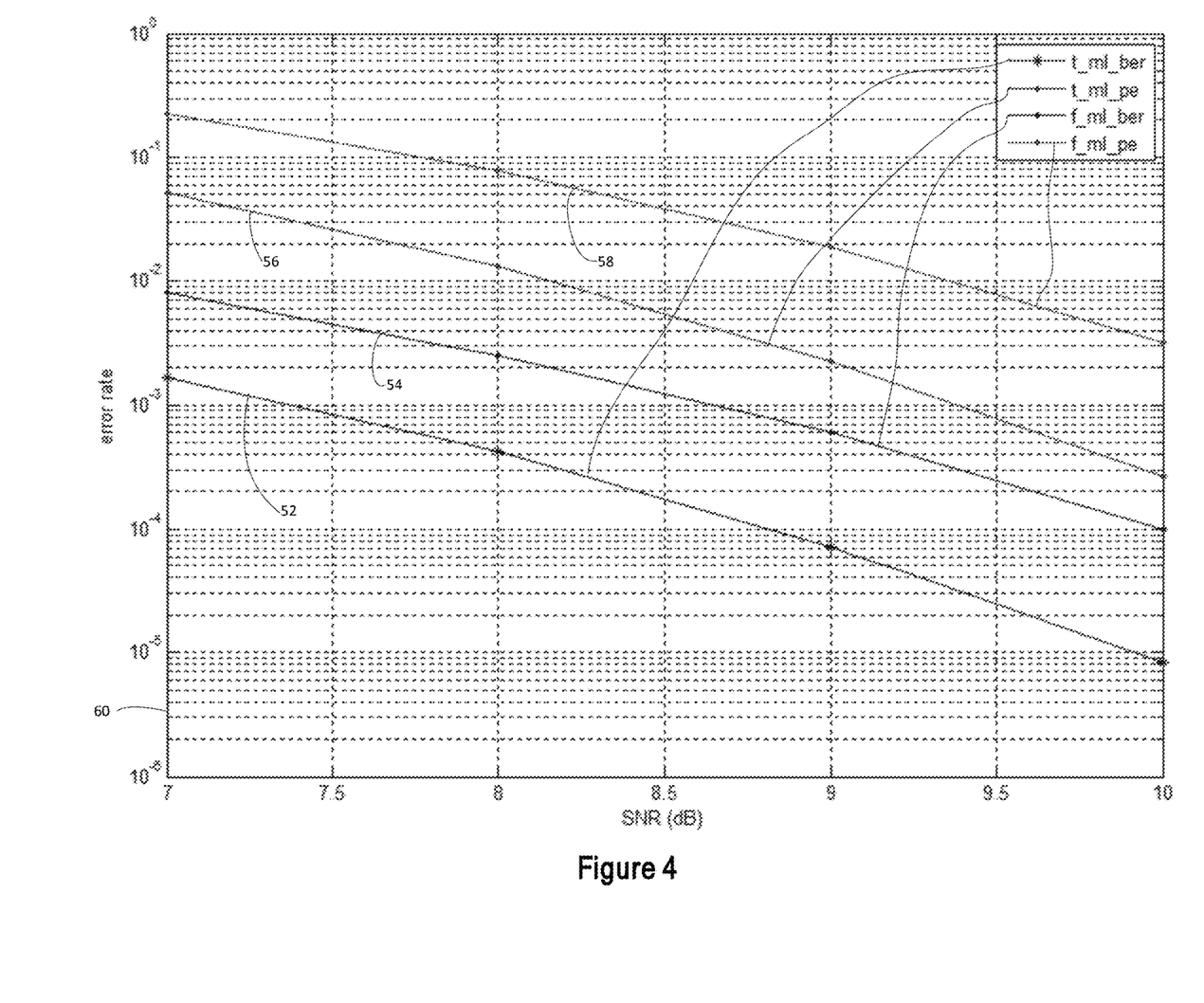
FIG. 4 is a graph of synchronization loss for time domain and frequency domain receivers plotted by error rate and signal to noise ration of the communication channel.

FIG. 4 shows a graph 60 the bit-error-rate (BER) performance of BLE systems using an optimal Maximum-Likelihood receiver operating in time-domain mode and in frequency-domain mode for different signal-to-noise ratio (SNR) conditions of the communication channel as present in the received signal. The signal-to-noise ratio is plotted on the horizontal axis and the error rate is plotted on the vertical axis. In an example, let the channel bit error rate (BER) be equal to $\varepsilon$, and assume that a 1 bit error in a 32-bits long access address code (AAC) will cause a synchronization loss (as provided in the Bluetooth SIG BQB test rule), then the synchronization loss rate is provided in the following formula.

$$Pe=1-(1-\varepsilon)^{32}$$

In the graph 60 of FIG. 4, the plotted line 52, also marked as "t_ml_ber" is the BER (bit error rate) curve of the optimal maximum-likelihood receiver in the time-domain; and the plotted line 54, also marked as "t_ml_pe" is its corresponding sync loss rate for the time domain receiver. The plotted line 56, also marked as "f_ml_ber" is the BER curve of an optimal maximum-likelihood receiver in the frequency-domain; and the plotted line 58, also marked as "f_ml_pe" is the corresponding sync loss rate for the frequency domain receiver.

The graph 60 shows that the synchronization loss rate Pe is lower for the time domain receiver at each error rate and at each signal-to-noise ratio of the received signal.

In spite of the better synch loss rate performance of time domain receivers, frequency domain receivers are preferred for use in Bluetooth systems. Some of the reasons that frequency domain receivers are preferred is that frequency domain receivers have lower complexity, lower power consumption, and more robust signal-to-gain variation, carrier offset and modulation variation impairments as compared to time domain receivers.

An expectation for Bluetooth systems of the future is that the Bluetooth system should consume less than 1% of the battery life of a mobile telephone. Working against the desired increase in battery life is the expectation by mobile telephone providers that the operating duty cycle of the Bluetooth system should be increased. It is expected that a Bluetooth receiver that is operating in BLE receiving mode and that is always scanning will provide an improvement in latency in communications with home automation devices, and with fitness and sports sensor devices.

For certain mobile devices such as certain smart telephones, expectations are that a drastically lowered power consumption requirement should be met for BLE scanning. The scanning function dominates the power budget that is allocated to a Bluetooth system in a 1% battery life impact constraint. In other words, the scanning function uses a large part of the power allocated to the Bluetooth system. Bluetooth power consumption has been identified as a KPI (key performance indicator) for mobile devices and, in particular, the BLE scanning power consumption KPI has been identified as an important KPI for BT (Bluetooth technology) systems. There is a need for new architectures and more efficient use of power in Bluetooth systems in all domains—RF (radio frequency) domain, PHY (physical) domain, digital power domain, ULPM (ultra-low power mode) leakage, XTAL (crystal) warm-up time, CPU (central processor unit) pre- and post-processing times, and the like, to lower overall power consumption associated with BLE scanning.

DETAILED DESCRIPTION

The present method and apparatus concerns synchronization of Bluetooth receivers and in particular Bluetooth receivers that operate according to conventional BLE (Bluetooth Low Energy) technology and Bluetooth receivers that operate according to classic Bluetooth technology. The present method and apparatus may enable frequency-domain Bluetooth receivers to achieve a synchronization performance that is comparable to the performance of time-domain Bluetooth receivers.

A more power efficient BLE synchronizer may be provided. In addition, an early termination technique is described. The method and apparatus may result in reduction of power required for the Bluetooth communications, which reduction may be a part of achieving the desired power optimization goals for future systems. In certain embodiments, the synchronizer described in this specification may consume only 20 µW (microWatts) of power. This power consumption may be compared to the power requirements for a time-domain based synchronizer which may be more than five times higher.

In certain aspects, the present method and apparatus may provide that the symbol timing of a received Bluetooth signal is detected first, which enables the receiver to convert from sampling rate-based logic in the receiver to a symbol-rate process for receiving further signals. The use of symbol rate processing uses less power than sampling rate processing, resulting in a power savings. The present method and apparatus may lower the hardware cost compared to a conventional sampling rate receiver apparatus. The present method and apparatus may also provide the capability for early termination of the Bluetooth communication, which reduces power by not operating the Bluetooth system when no signal is available. The present method may provide for relaxing of the requirements for system crystal accuracy, also reduces the power required by the apparatus, so as to further provide a lower power usage for the system.

The present method and apparatus utilizes a soft threshold, which improves the synchronization performance of the receiver without violating Bluetooth SIG (Special Interest Group) testing requirements and also provides the capability for a channel condition estimation.

1. A timing tracking feature of the present method and apparatus may provide the capability of early termination of a Bluetooth communication, permitting portions of the circuit to be unpowered following the early termination. The timing tracking feature also permits the system to operate at a reduced system crystal accuracy. As a result, the system crystal accuracy requirements for the circuit may relaxed. A less stringent requirement on the circuit design permits a lower power consuming circuit configuration to be used.

2. A soft threshold feature may result in a frequency-domain receiver being able to achieve a performance at or near that of a time-domain receiver; and also provides the capability to provide channel condition estimation for the communication channel.

A. System Architecture

Figure 5:
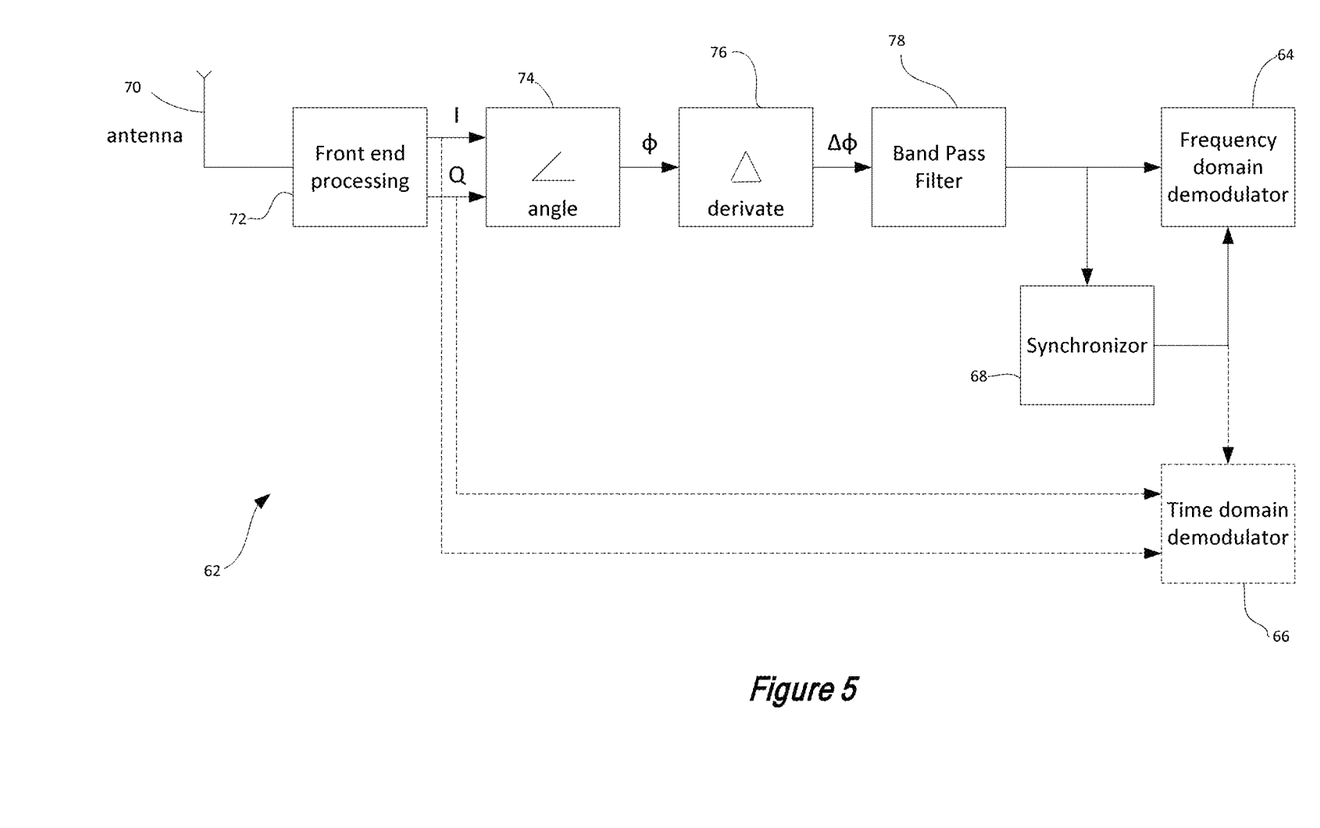
FIG. 5 is a functional block diagraph of a Bluetooth receiver including frequency domain and time domain operation.

In general, there are two type receivers used in a 2GFSK (binary Gaussian frequency shift keying) modulation system 62 as shown in FIG. 5. The system 62 uses two demodulators 64 and 66. Demodulators are known and understood by those of skill in this art and will not be described in detail in this specification. Known demodulator configurations may be used in the present system. For this portion of the specification, we will focus on a synchronization block 68, which provides the timing information to the demodulators 64 and 66 for demodulating the user payload data of the received Bluetooth signal. The synchronization function by the synchronizer block 68 is always working when the receiver 62 is using the frequency domain receiver 64 and operating in the frequency domain mode. The synchronizer 68 is able to selectively turn on the time domain demodulator 66, as indicated by the broken lines, so as to provide a time-domain receiver function for the receiver 62. The operation of the receiver 62 in either the frequency domain mode using the frequency domain demodulator 64 or operating in the time domain mode using the time domain demodulator 66 is controlled by the synchronizer 68 base on an estimation of the communication channel condition by the synchronizer 68. When the channel condition is estimated by the synchronizer to be good, the frequency-domain receiver mode may be selected to lower the system power consumption; otherwise, time-domain receiver should be selected. For example, if the channel condition is estimated to be good, which may mean that the receiver is operating at or near the theoretical performance boundary for a frequency-domain receiver, then the frequency-domain receiver function is used. If the channel condition is estimated to be less than the theoretical performance for the frequency domain receiver, then the time-domain receiver function is used. The synchronizer 68 switches on the time domain demodulator 66 to enable the time domain operation.

In the receiver 62 of FIG. 5, an antenna 70 receives a wireless Bluetooth signal from a sending device. The received signal is communicated to a front-end-processing block 72. The front end processing block 72 performs the functions of channel selection, filtering and carrier removal on the received signal, which yields baseband I and Q path signals with an oversampling rate. The I and Q path signals are provided to an angle determining block 74 which determines the phase angle φ signal of the I/Q signal. The phase signal φ is provided to a derivate block 76 that generates a differential phase output signal Δφ. The output of the derivate block 76 is a signal that equals the phase of the current input signal subtracted from the phase of the previous input signal, which is a frequency domain signal. As a result of the differential operation, the differential phase output signal Δφ includes a carrier offset as a DC (direct current) component of the signal. To remove the DC component, the differential phase output signal Δφ is provided to an input of a band pass filter 78. The lower cut off of the band-pass filter 78 removes the DC component of the signal. The higher cut of the band-pass filter 78 suppresses any out-of-band interference. The resulting signal is a filtered differential phase signal.

The output of the band pass filter 78 is provided to both the synchronizer 68 and to the frequency domain demodulator 64. The synchronization function of the synchronizer 68 captures the access address code (AAC) from the frequency domain signal, and then provides accurate timing information based on the access address code to the frequency domain demodulator 64, which operates to decode the user payload data contained in the received signal.

If the synchronizer 68 determines that the channel estimation is not good for the frequency domain operation, the synchronizer 68 switches on the time domain demodulator 66, which receives the I and Q path signals from the front end processing block 72; otherwise performs frequency domain processing on the signals. Either the frequency domain demodulator 64 or the time domain demodulator 66 provide output signals on outputs (not shown) if it is selected, at which the demodulated signals are provided for further processing or use by the device, as is well known to those of skill in this art.

B. Synchronizer Configuration

Without losing generality, an example is presented of a BLE system to describe the synchronizer 68 configuration. The example can cover a classic Bluetooth system by modifying a correlation window size.

Figure 6:
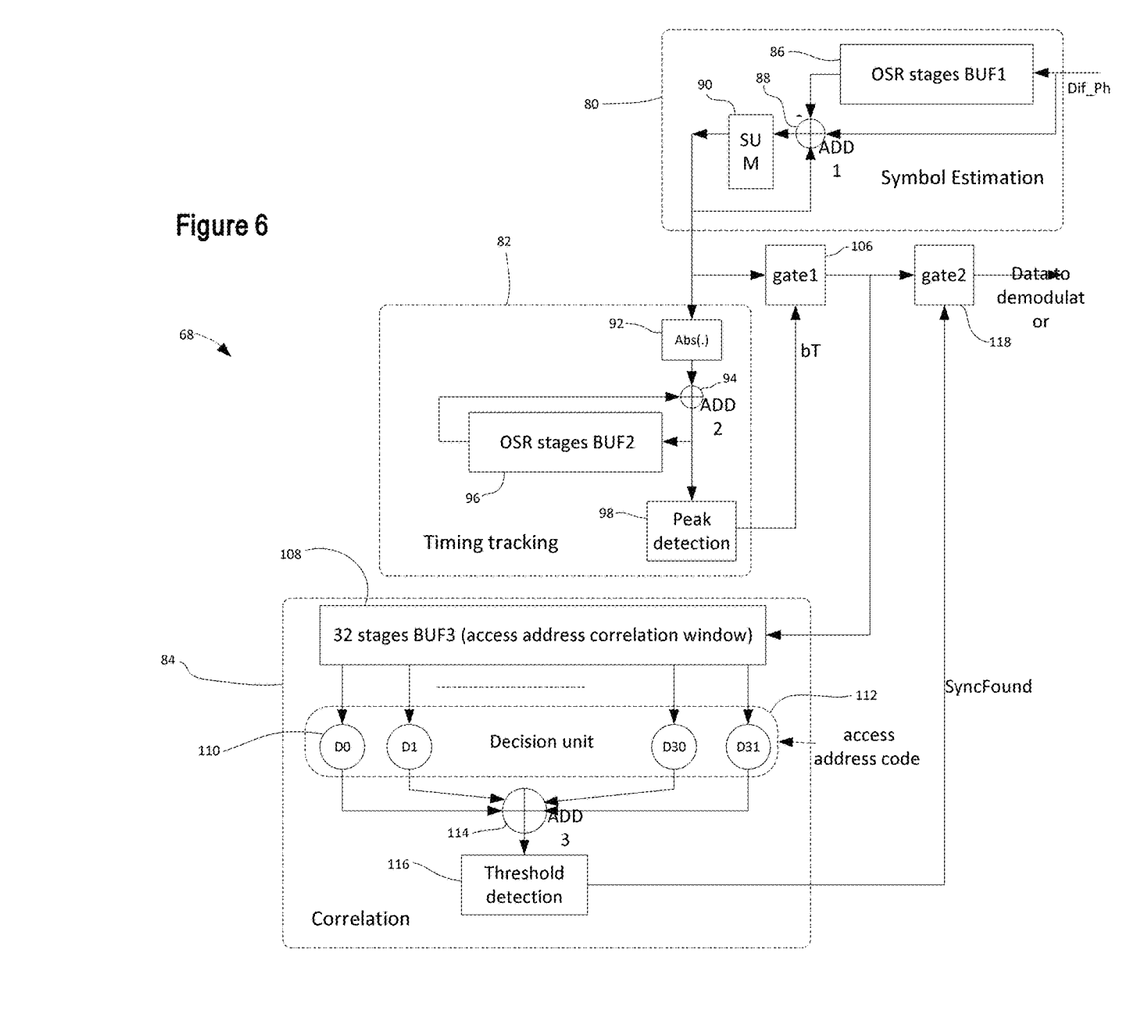
FIG. 6 is a functional block diagram of a synchronizer for a Bluetooth receiver.

The configuration of an example of the synchronizer 68 is shown in FIG. 6. There are three major function blocks in the synchronizer 68, including: a symbol estimation block 80, a timing tracking block 82, and a correlation block 84. In FIG. 6, OSR denotes signal over sampling rate. In general, for fine timing purpose, a received signal need be over sampled, i.e., one data symbol of the received signal has multiple samples of that symbol, the number of the samples being determined by the over sampling rate OSR.

The symbol estimation block 80 receives the differential phase signal Dif_Ph, which may be the filtered differential phase signal provided at the output of the bandpass filter 78. The differential phase signal Dif_Ph is provided to an OSR stages BUF1 block 86. The OSR stages BUF1 block 86 is an OSR stage flip-flop register type buffer. The output of the buffer 86 is provided to a subtracting input of an adder ADD1 element 88. The output of the adder element 88 is provided to a SUM block 90 which may be a one stage flip-flop register buffer. The adder ADD1 block 88 receives the output of the buffer 86, a copy of the differential phase signal Dif_Ph, and a feedback signal from the output of the SUM block 90. The adder 88 which adds the SUM output with the current differential phase input and subtracts the (OSR+1)th previous differential phase input, the result is buffered into the SUM block 90. The SUM block 90 and adder ADD1 element 88 work together as an accumulator, which operates according to the following equation.

$$SUM(n) = \sum_{k=0}^{OSR-1} \Delta\varphi(n-k) \ n = 0, 1, 2 \ldots \ldots$$

where SUM(n) denotes the value stored in the SUM buffer 90 at a time n; and $\Delta\varphi(n)$ is the differential phase input at a time n. Thus, the SUM block 90 is buffering the accumulation of OSR consecutive differential phase input, which is a kind of symbol data estimation for 2GFSK modulation. The OSR consecutive SUM block 90 outputs will provide an OSR versions estimation of a received symbol with a different timing offset. The synchronization function will figure which timing offset is the optimum one.

A timing tracking block 82 includes an absolute value ABS(.) block 92 that operates to take an absolute value of an input signal and provide it as an output. An adder ADD2 element 94 is an adder that receives the output of the absolute value block 92. An OSR stages BUF2 block 96 is a ORS stage flip-flop type buffer that receives its input from the adder ADD2 94 but also provides its output to the adder ADD2 94. In certain aspects, the buffer 96 should be cleared at a beginning of apparatus operation. The OSR version estimations of a received symbol is accumulated in the buffer BUF2 96 with the same timing-shifts version of a previously estimated symbol. Because only one version of symbol estimation is correct at a symbol boundary, a peak will show up with the accumulation processing. A peak detector 98 is connected to receive the output of the adder 94 and is operable to check a peak position (which is output as a signal denoted as bT=best timing) of the accumulation for every OSR inputs.

Figure 7:
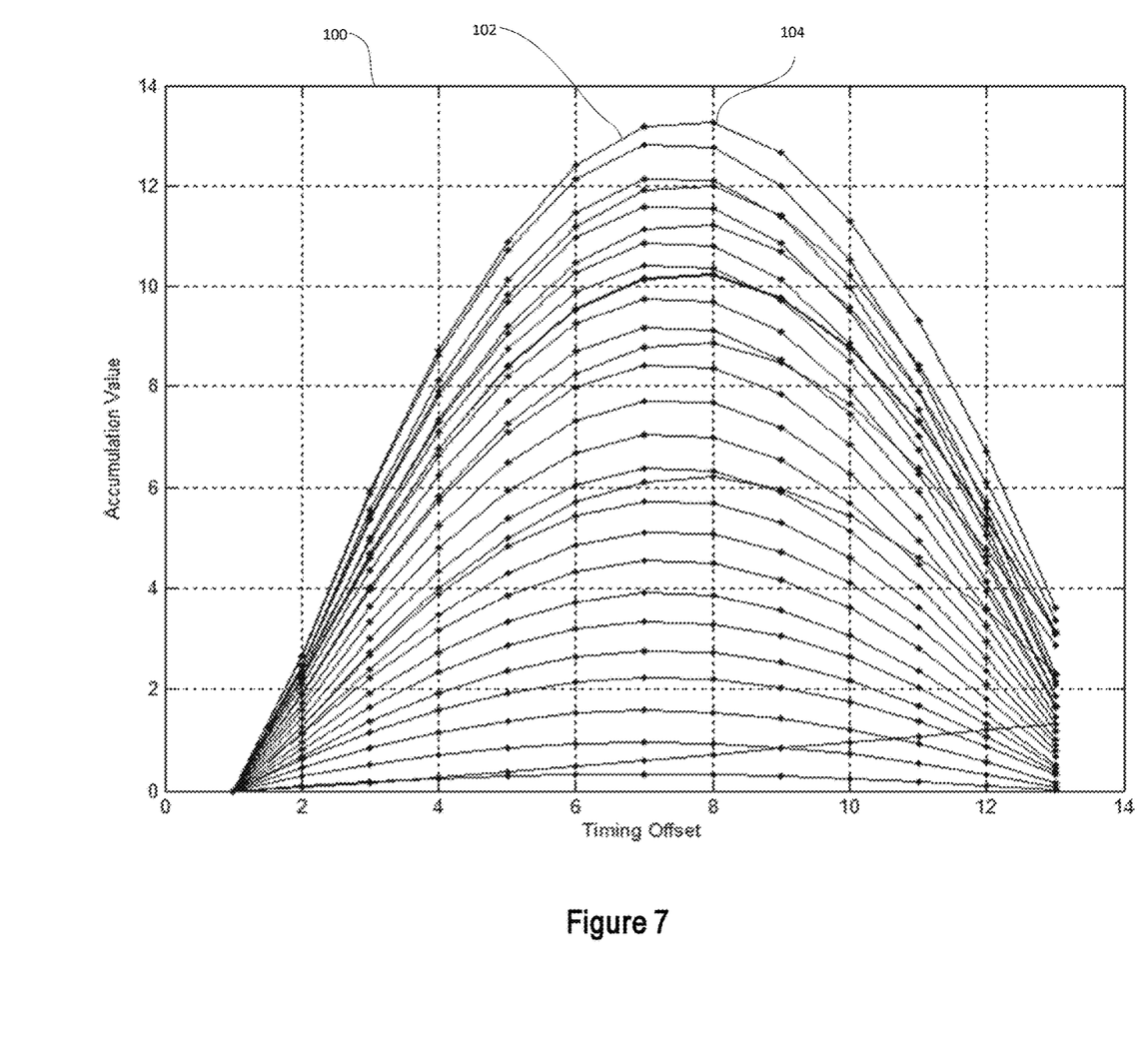
FIG. 7 is a graph of timing tracker accumulation values, plotted over timing offset.

A graph 100 of FIG. 7 shows a simulation result with an OSR (over sampling rate)=13. Each curve 102 is of 13 points and represents an accumulation result after 13 inputs. With the accumulation of value over time, an accumulation peak 104 becomes higher and higher, and the peak point 104 tends to show up at a particular point. To prevent the overflow of the buffer BUF2 block 92, some kind of normalization mechanism is needed which is omitted in this example for the sake of simplicity, but which is understood by those of skill in this art.

A gate Gate1 element 106 is connected to receive the output signal bT of the peak detection block 98 The gate 106 will turn on once, at the bT (best timing) point, for every OSR input. The output of the gate 106 is thus at the symbol rate rather than at the higher over sampling rate.

The best timing bT can be initialized to any value at the beginning of apparatus operation; the best timing value bT will converge to an optimal value after the apparatus is operated for a while. If the best timing bT can't (or doesn't) converge to a value within a certain time period, it can be assumed that no desired 2GFSK (binary Gaussian frequency shift keying) signal is being received by the 2GFSK modulation system 62. Since no desired signal is being received by the receiver, the data packet receiving function is terminated as an early termination of the circuit operation to save power. Power used by the circuit is thereby reduced. As another power saving feature, if the system oscillator crystal circuit drifts in frequency, the best timing bT point tracks the drifting signal, permitting the timing function to operate correctly even when the oscillator signal drifts. This is distinguished from the conventional Bluetooth systems which lack timing tracking. Since the timing tracking feature is provided, the requirements for accuracy of the system crystal signal may be relaxed. Circuits which are not required to adhere to strict accuracy for the crystal signal may operate a lower power than the circuits which must adhere to strict crystal signal requirements, which provides another power saving in the device.

The correlation block 84 receives as its input a signal output by the gate1 106 that is at the symbol rate and not at the higher over sampling rate. The correlation window size is independent of the over sampling rate OSR. Operating the correlation block 84 means that lower cost components/circuits may be used to construct the correlation block 84. The lower rate thus helps to provide a potential for hardware cost saving by the use of the lower cost components/circuits compared to an apparatus that is required to operate at the higher sampling rate.

In FIG. 6 the symbol rate signal from the gate 106 is provided to an input of a buffer 108. The buffer 108 of the illustrated embodiment is a 32 stage buffer BUF3, which provides an access address correlation window. The buffer 108 provides inputs to 32 parallel decision units 110. The decision units 110 collectively provide a decision unit 112 to obtain an access address code. The outputs of the decision units 110 are provided to an adder ADD3 unit 114. Briefly, the adder unit 114 output is provided to a threshold detection block 116. The threshold detector 116 provides a sync found signal to a gate2 gate element 118, the output of which is provided as data to the demodulator The decision units 110 are shown as parallel units for an easier explanation but they can instead be implemented in serial processing arrangement. The logic of each decision unit 110 is explained below.

Let a 32-bits AAC (address access code) be expressed as $(a_0, a_1, \ldots, a_{31})$, $a_i \in \{0, 1\}$, $i=0, 1, \ldots, 31$; and the corresponding mapped sequence $(s_0, s_1, \ldots, s_{31})$, where $$s_i = \begin{cases} +1 & \text{if } a_i = 1 \\ -1 & \text{if } a_i = 0 \end{cases} \quad i = 0, 1, \ldots, 31$$

Figure 8:
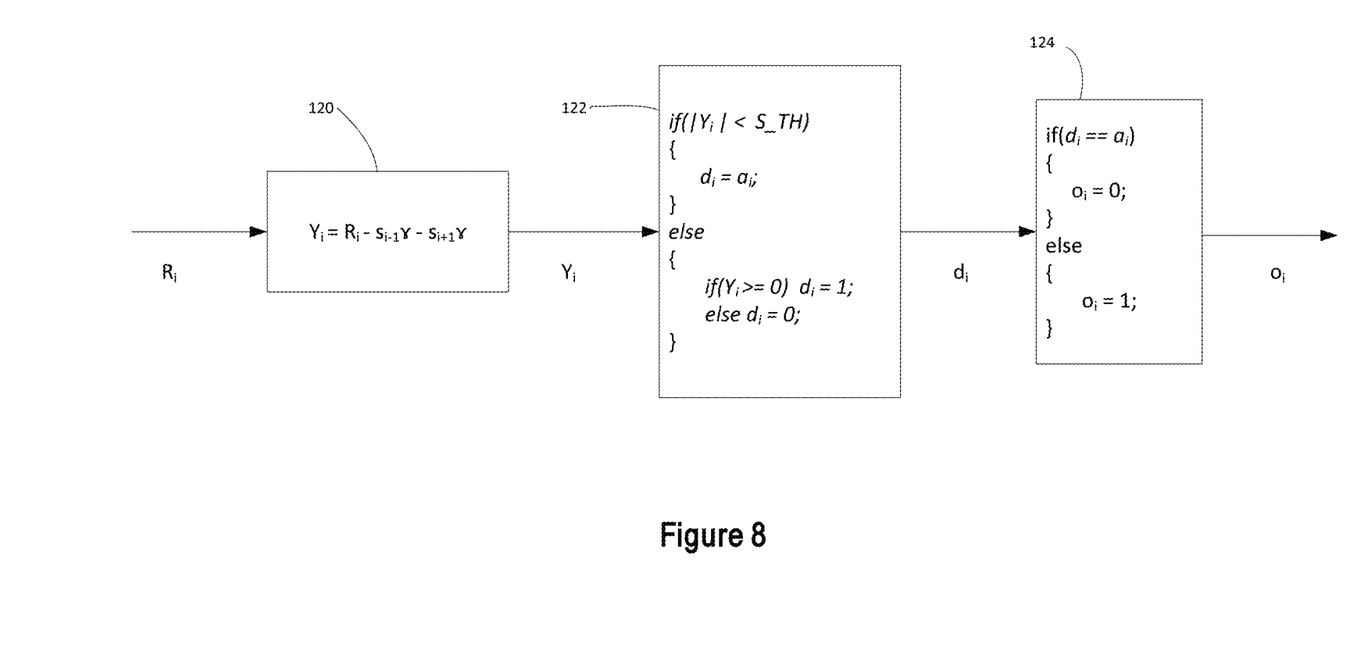
FIG. 8 is a functional block diagram of a decision unit.

With the above definition, the decision unit 112 is configured and/or programmed to operate according to the logic shown in FIG. 8. An input $R_i$ denotes the ith received data R in the correlation window buffer 108 (see FIG. 6) and $s_i$ is the symbol data. A logic block 120 includes the logic $Y_i = R_i - s_{i-1}\gamma - s_{i+1}\gamma$ which performs an ISI (inter symbol interference) cancellation, where $\gamma$ is the ISI factor introduced by the GFSK modulation, and symbol data $s_{i-1}$ and $s_{i+1}$ are the previous and the subsequent symbols of the symbol $s_i$. Because the symbols $s_{i-1}$ and $-s_{i+1}$ are either +1 or −1, no multiplication operation is needed for the ISI cancellation.

The output $Y_i$ (which is an ISI corrected result of the $R_i$ data) of the logic block 120 is provided to the logic block 122. For 2GFSK modulation with a modulation index h, the ideal phase span of a received symbol should be ±hπ. A key point of the proposed algorithm is the selection of a soft threshold value S_TH which is smaller than hπ. When $|Y_i|<$S_TH happens (the absolute value of the output $Y_i$ is less than the soft threshold), we assume the data $d_i$ is $a_i$—in other words, the received data $d_i$ is erased and is replaced by the assumed data $a_i$; otherwise, the value of the decision data $d_i$ is based on the conventional decision rule. When soft threshold is met, the received data $d_i$ is assigned to be equal to local AAC data $a_i$, i.e., we ignore what $d_i$ should be based on the real decision rule. It is why we say di is erased. In particular, if the value of $Y_i$ is greater than zero, then the decision data $d_i$ is set to 1, else decision data $d_i$ is set to zero. The decision data $d_i$ is provided to logic block 124 where the decision data $d_i$ is tested for equality with $a_i$ (the assumed data) using the (==) function, which test determines the value of an output data $o_i$.

Because $|Y_i|<$S_TH in block 122 will not happen at high SNR conditions of the communication channel, the proposed algorithm will not violate the BQB testing rule. If $|Y_i|<$S_TH happens (the absolute value of $Y_i$ is below the soft threshold), it means the received data is experiencing a certain level of interference. The assumed data replaces the received data, $d_i=a_i$, i.e. erasing the received data, will help a lot on the sync loss rate. This condition also provides a good estimation of the channel condition by which the synchronizer 68 can decide when the better performance of the time domain demodulator 66 should be used; when the low power consumption frequency domain receiver (the signal path including the frequency domain demodulator 64) should be used; and when the receiving signal quality is out of range.

The threshold detection unit 116 receives an input which indicates the total number of bit-errors in the AAC detection step. For classic Bluetooth systems, the AAC (access address code) is protected with a (64, 30) BCH (broadcast channel) code which minimum Hamming distance is 15. The channel code can correct 7-bits errors so that the threshold at the threshold detection unit can be set to a value of 7. For BLE systems, under normal operation, the threshold should be set as 0 due to the BQB testing rule, i.e., the decision data should be exactly matched with the local AAC for the sync found claim signal to be output. But for some special cases, this threshold can be set to a value larger than 0 for Bluetooth signal existence detection purposes under very low SNR conditions.

When the correlation value meets a certain threshold as determined by the threshold detection unit 116, the SyncFound signal can be outputted as a claim or indication that the synchronization has been found. The output of the sync found signal means that the access address code acquisition is done, i.e., the correlation operation by the correlation unit 84 can be stopped and the gate2 element 118 can be turned on. The output of the gate2 element 118 can be directly fed into the input of the frequency-domain demodulator 64 for frequency domain operation of the receiver if the synchronization unit has determined that frequency domain mode should be used. If the synchronization unit determines that the time domain mode should be used, the time domain demodulator 66 is used. The input to the time domain demodulator 66 should come from the front-end processing block 72 (as shown in FIG. 5) guided by the timing information from the synchronizer 68.

C. Further Aspects of the Correlator

In FIG. 6, a 32 stages buffer BUF3 108 is provided as an example for Bluetooth Low Energy (BLE) system. The principles of the present method and apparatus can be extended to the classic Bluetooth system by including a longer buffer in place of the buffer 108 as shown.

In FIG. 6, the entire AAC (access address code) is correlated, then a determination or claim is made that the synchronization has been found. Alternatively, the AAC can be divided into a plurality of segments and the correlator 84 can work in a segment-by-segment manner to determine if the sync is found. By dividing the AAC into segments, the correlator need only be large enough to process a segment, so that hardware costs can be reduced by providing a correlator for processing shorter data strings.

In FIG. 6, the synchronizer 68 is turned on before received AAC signal comes in, so that the received data is put into a sliding window of the buffer BUF3 108 to correlate with local AAC reference data. In a practical application scenario, the synchronizer 68 may be turned on later than when the AAC signal is coming in. In this case, the local AAC reference data is put into a sliding window to correlate with the received signal. Because of the simplicity of the decision unit 112 in the correlation operation, the hardware cost for the present decision unit 112 is not very high.

Figure 9:
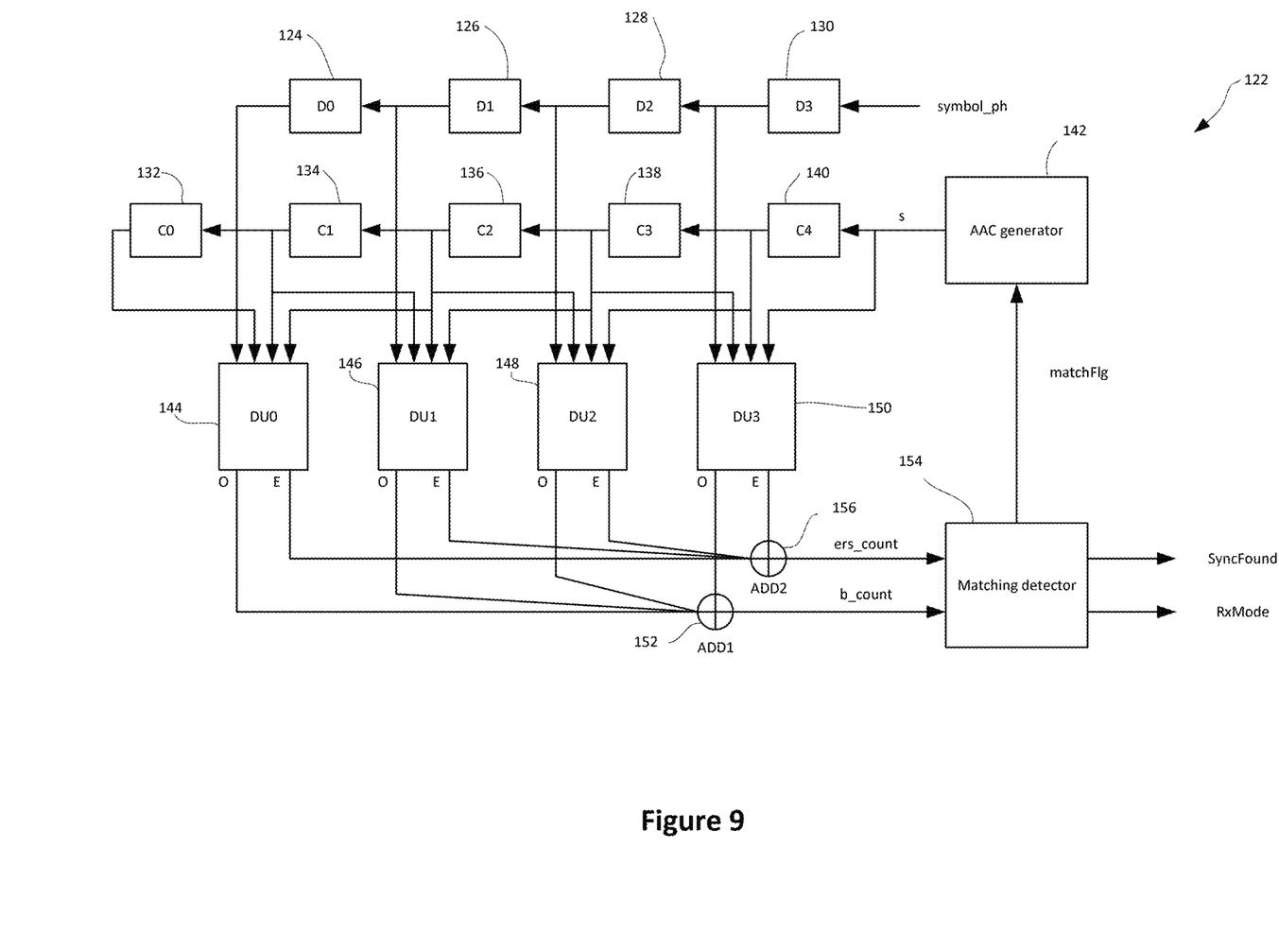
FIG. 9 is a functional block diagram of a correlator.

The above description of dividing the AAC into segments and turning the synchronizer on later is explained in more detail with an example of correlator 122 as shown in FIG. 9.

In this design, the AAC is divided into multiple segments with four symbols in every segment. Four registers D0 through D3, part numbers 124, 126, 128 and 130, are provided to buffer the gate1 (see FIG. 6) output, shown as symbol_ph. Five registers C0 through C4, part numbers 132, 134, 136, 138 and 140, are provided to buffer AAC data from an AAC generator 142. Four decision units DU0 through DU3, part numbers 144, 146, 148 and 150, are provided for matching detection. Each decision unit 144-150 has an E output and an O output. The O outputs are connected to an adder ADD1 152 to provide a b_count input to a matching detector 154 and the E outputs of the decision units 140-150 are provided to an adder ADD2 156 to provide an ers_count signal to the matching detector 154. The E outputs and the ers_count signal provide erasure indications. The matching detector 154 sends a matching flag signal to the AAC generator 142 and outputs a sync found signal and an RxMode signal.

Figure 10:
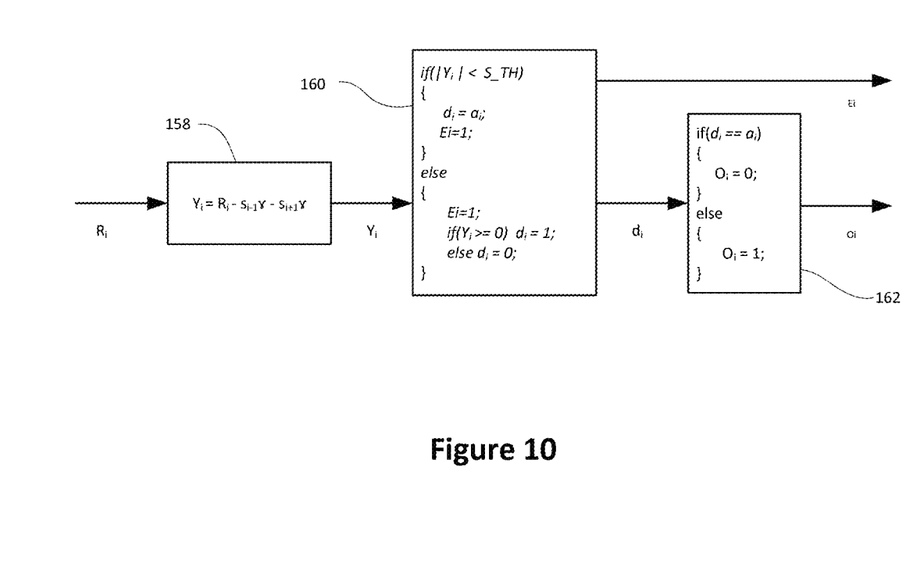
FIG. 10 is a functional block diagram of a decision unit having an erasure flag.

Referring to FIG. 10, the decision unit logic is shown for the decision units 140-150. A first logic block 158 is similar to the logic block 120 of FIG. 8. Different from logic block 122 of FIG. 8, a second logic block 160 outputs an erasure flag $E_i$ from the decision unit. The erasure flag $E_i$ is set to one if the absolute value of $Y_i$ is less than the soft threshold and the $d_i=a_i$ is established to erase the data. The third logic block 162 is similar to the logic block 124 of FIG. 8. As shown in FIG. 10, when the soft threshold is triggered, the received data is replaced with the corresponding assumed AAC bit—the received data is erased.

The AAC generator 142 needs to generate the first four AAC symbols first with a preamble symbol padding at beginning. For every new received data coming in to the receiver, the correlation will be checked. The "O" output indicates whether the received data matches the corresponding AAC bit; the "E" output shows whether the received bit has been erased. Once the segment of four AAC symbols are matched, the next segment of AAC symbols will be pushed in. The processing of each segment continues until the entire AAC be matched. After the entire AAC matched, the matching detector 154 will check on the total number of erasure flags. The higher the erasure rate, the worse the channel condition will be. Therefore, the matching detector 154 may recommend which type receiver (frequency domain or time domain) should be used based on the total number of the erasure flags.

At beginning for every new received data coming in, the AAC generator 142 will push out the AAC data sequentially to check which part of the AAC matches with the received data in the decision units D0 through D3 124-130. After a first matching is archived, the AAC generator 142 will send out the data from the matched point on a segment-by-segment basis to correlate with the new received data until the end of the AAC data is reached.

D. Simulation Results

Figure 11:
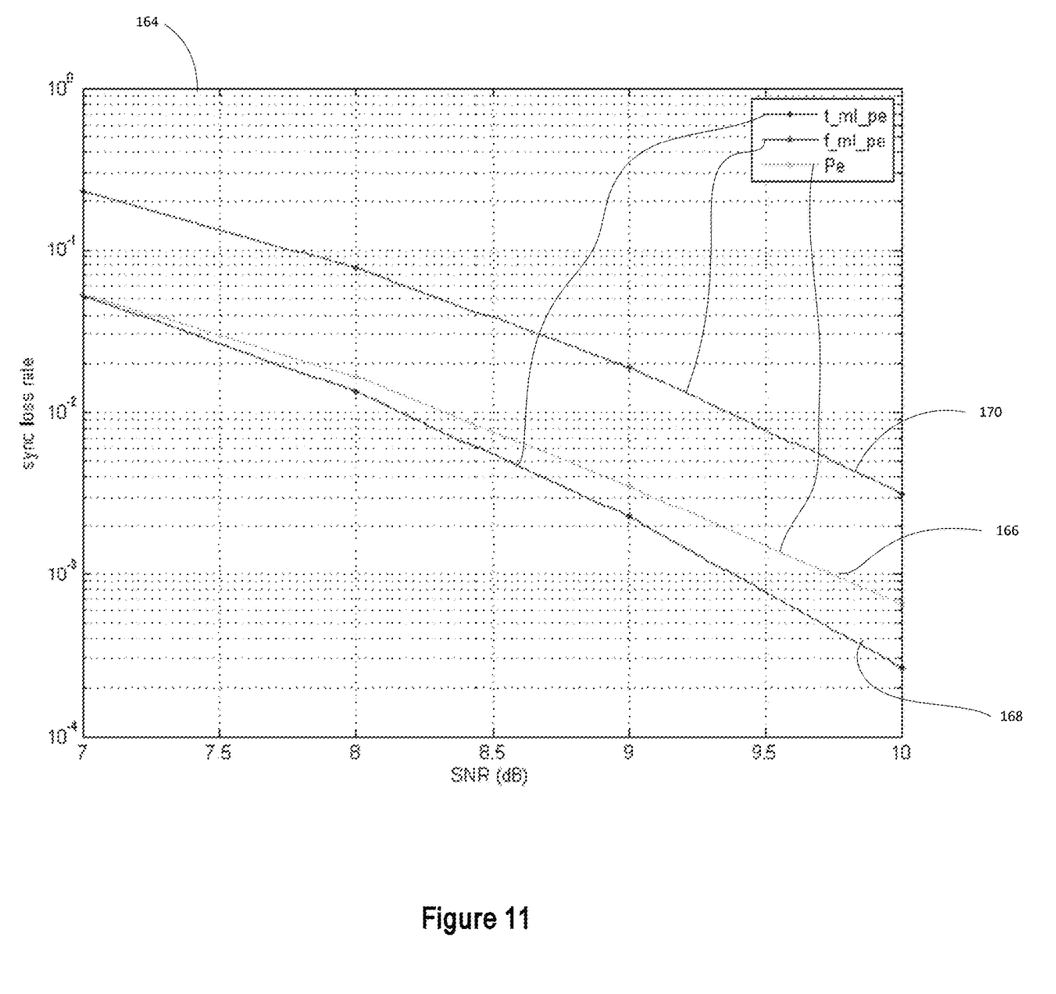
FIG. 11 is a graph of synchronization loss rate for the time domain and frequency domain receivers.

The present method and apparatus has been simulated for a Bluetooth Low Energy (BLE) system operating with a modulation index h=0.5, and the results are shown in a graph 164 in FIG. 11. In the simulation, the soft threshold S_TH is set as hrt/2.5. The reason for choosing 2.5 as the value for the threshold is trying to make the soft threshold lower than the ideal phase span of classic Bluetooth system whose modulation index is between 0.28 through 0.35, which avoids the classic Bluetooth system from mis-locking onto a BLE system. The "Pe" curve 166 is for the threshold detection block being set as 0. The "t_ml_pe" time domain curve 168 and "f_ml_pe" frequency domain curve 170 are the same as in FIG. 4. By comparing with the ideal synchronizer performance boundary, we can see that the proposed frequency-domain synchronizer design is good enough to support high performance time-domain demodulator design.

The value selection of the soft threshold is further explained. The ideal value of $Y_i$ is known (see above), but its real receiving value is varying due to interference. A soft threshold is used as a metric to judge if the $Y_i$ is reliable or not, then it can be erased if it is not reliable. Each AAC bit is either 0 or 1 (hard value), but the $Y_i$ value has a certain range (not just 0 or 1), so thus it is "soft".

The Hamming distance refers to that within the entire AAC, how many bit errors are allowed for claiming the entire AAC has been matched—sync found claim.

E. Features Summary

1. Timing Tracking

The present method and apparatus detects the symbol timing first. The symbol timing detection is independent from the modulation index value, so it can support both classic Bluetooth and BLE systems. This feature provides the system with the following benefits:

a) Early termination for system power saving: if the best timing point can't converge in certain period of time, it means no Bluetooth signal is there. Then the receiving processing can be terminated.

b) Lower the requirement to system clock accuracy for power saving.

2. Soft Threshold

It benefits the system in following aspects:

a) Using lower power frequency-domain mode to support a high performance time-domain receiver as shown in FIG. 5.

a) Parallel scan option: FIG. 11 shows the BLE sync performance where one soft threshold is used. As an alternative use 2 soft thresholds, S_TH_1 and S_TH_2, can be used for BLE and classic Bluetooth systems using a parallel scan. Set the value of the first threshold S_TH_1 around the ideal phase span value of a classic Bluetooth system; and set the value of the second threshold S_TH_2 lower than the ideal phase span value of a classic Bluetooth system, then both the first and second thresholds S_TH_1 and S_TH_2 will not be often triggered with BLE signal; and the first threshold S_TH_1 will be often trigger and second threshold S_TH_2 will not be often triggered with a classic Bluetooth signal. If both the first threshold S_TH_1 and the second threshold S_TH_2 are often triggered, it means that the channel condition is not good.

c) Receiver type switching feature: Because a soft threshold is able to estimate the channel condition, it can select to operate using either a high performance time-domain receiver or a low power frequency-domain receiver based on the channel condition.

Various aspects of the method and apparatus are provided according to the following.

In a first aspect, a method for synchronizing a wireless communication receiver, comprising: estimating a communication channel condition for a wireless communication to be received by the wireless communication receiver; synchronizing a wireless communication by operating the wireless communication receiver in a frequency domain mode if the estimating estimates a first communication channel condition, the receiver operating in the frequency domain mode providing lower power consumption by the wireless communication receiver than operating the receiver in a time domain mode; and synchronizing a wireless communication by operating the wireless communication receiver in a time domain mode if the estimating estimates a second communication channel condition, the receiver operating in time domain mode providing better bit-error rate performance on user data portion than operating the receiver in the frequency domain mode.

In a second aspect, a method of the first aspect, wherein the estimating the communication channel condition includes deciding an address code of a wireless communication signal; and comparing the decided address code to a threshold.

In a third aspect, a method of the second aspect, wherein the threshold is a soft threshold.

In a fourth aspect, a method of the third aspect, wherein the soft threshold is of a value that is less than an ideal phase span of a received signal.

In a fifth aspect, a method of the second aspect, further comprising: replacing a received data with an assumed data if the comparing determines that the decided address code is less than the threshold.

In a sixth aspect, a method of the first aspect, wherein the estimating the communication channel condition includes oversampling a received wireless communication signal; detecting a symbol rate of the oversampled received wireless communication signal; and processing the received wireless communication signal at the symbol rate.

In a seventh aspect, a method of the sixth aspect, wherein the detecting the symbol rate includes timing tracking by accumulating estimations of a symbol; and detecting a peak of accumulated estimations as a timing point of the symbol.

In an eighth aspect, a method of a seventh aspect, further comprising: operating the receiver using a timing signal based on the detected timing point when a system crystal timing signal of the receiver drifts.

In a ninth aspect, a method of a first aspect, wherein the estimating the communication channel condition determines that no wireless communication signal that the receiver is capable of decoding is present; and terminating operation of at least a portion of the receiver upon determining that no signal that the receiver is capable of decoding is present.

In a tenth aspect, a method of a ninth aspect, wherein the determination that no wireless communication signal that the receiver is capable of decoding is present includes: accumulating estimates of symbol values; determining that the accumulating estimates of symbol values have not converged to a value; and indicating that no decodable signal is present based on the determination that the accumulated estimates have not converged to a value.

In an eleventh aspect, an apparatus for synchronizing a wireless communication receiver, comprising: a synchronizer connected to receive data communicated via a wireless communication channel and operable to determine a channel condition of the wireless communication channel; a frequency domain demodulator connected to the synchronizer, the frequency domain demodulator being operable to decode the received data in a frequency domain operating mode; a time domain demodulator connected to the synchronizer, the time domain demodulator being operable to decode the received data in a time domain operating mode; the synchronizer controlling the frequency domain demodulator and the time domain demodulator to operate either the frequency domain demodulator or the time domain demodulator depending on the determined channel condition of the wireless communication channel.

In a twelfth aspect, an apparatus of an eleventh aspect, wherein the synchronizer includes: an estimator connected to receive a received signal and operable to estimate a symbol of the received signal; a time tracker connected to receive the estimated symbol from the estimator and operable to detect a peak of the estimated signal; and a correlator connected to receive a peak from the time tracker and operable to decide on an address code and operable to compare a decided address code to a predetermined threshold, the correlator being operable to output a signal indicating a synchronization found if the decided address code meets the predetermined threshold.

In a thirteenth aspect, an apparatus of a twelfth aspect, wherein the correlator includes a buffer of a length and a plurality of decision units of a number so as to simultaneously correlate all symbols of an entire address code.

In a fourteenth aspect, an apparatus of a twelfth aspect, wherein the correlator include a plurality of registers and a plurality of decision units of a number so as to correlate symbols of an address code in segments.

In a fifteenth aspect, an apparatus of a twelfth aspect, wherein the correlator is operable to replace an assumed code in place of a decided code if the predetermined threshold is met.

In a sixteenth aspect, an apparatus of the twelfth aspect, wherein the estimator operates at an over sampling rate on the received data; and wherein the correlator operates at a symbol rate based on the peak signal from the time tracker.

In a seventeenth aspect, an apparatus of the twelfth aspect, wherein the time tracker operates to accumulate estimations of a symbol to obtain a peak of the accumulated estimations as the timing point of the symbol.

In an eighteenth aspect, an apparatus of the eleventh aspect, wherein the synchronizer is operable to determine that no signal is being received that the receiver can decode and is connected to terminate at least one receiver function upon determining that no signal is being received that the receiver can decode.

In a nineteenth aspect, a method for synchronizing a wireless communication receiver, comprising: receiving an oversampled wireless communication signal having a plurality of samples for each signal in the received signal, the oversampled wireless signal being sampled at an oversampling rate; determining a symbol rate of the received signal, the symbol rate being lower than the oversampling rate; correlating the received signal to a local reference signal at the symbol rate.

In a twentieth aspect, a method of the nineteenth aspect, wherein the determining includes: generating differential signals corresponding to the plurality of samples of the received signal; accumulating the differential signals as an accumulated value; and detecting a peak of the accumulated value as a best timing point for the symbol rate.

In a twenty-first aspect, a method of the twentieth aspect, wherein the accumulating includes: subtracting a previous differential signal of the received signal from a current differential signal of the received signal; and time shifting the previous differential signal for the accumulating with the current differential signal.

In a twenty-second aspect, a method of the twentieth aspect, further comprising: time tracking the synchronizing based on the best timing point so that the synchronization tracks any drift in the received signal.

In a twenty-third aspect, a method of the twentieth aspect, wherein the detecting a peak fails to detect a converging value as a best timing point; determining that the failure to detect a converging value indicates an absence of a decodable signal; and terminating operation of at least a portion of a circuit of the wireless communication receiver.

In a twenty-fourth aspect, an apparatus for synchronizing a wireless communication receiver, comprising: means for estimating a communication channel condition for a wireless communication to be received by the wireless communication receiver; means for synchronizing the wireless communication receiver for wireless communication in a frequency domain mode if the means for estimating estimates a first channel condition; and means for synchronizing the wireless communication receiver for wireless communication in a time domain mode if the means for estimating estimates a second channel condition.

In a twenty-fifth aspect, an apparatus for synchronizing a wireless communication receiver, comprising: means for oversampling a received wireless communication signal to obtain a plurality of samples of each signal of the wireless communication signal; means for detecting a symbol rate of the received wireless communication signal; and means for processing the received wireless communication signal at the detected symbol rate.

In a twenty-sixth aspect, an apparatus for synchronizing a wireless communication receiver, comprising: means for detecting a timing point of symbols of a received wireless communication signal; and operating the receiver using a timing signal based on timing point of the symbols as a timing signal for the receiver.

In a twenty-seventh aspect, an apparatus for synchronizing a wireless communication receiver, comprising: means for detecting a timing point of symbols of a received wireless communication signal; and means for terminating processing operation of the receiver upon the means for detecting failing to detect the timing point of the symbols of the received wireless communication signal.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

We claim:

1. A method for synchronizing a wireless communication receiver, comprising:
   estimating a communication channel condition for a wireless communication to be received by the wireless communication receiver, wherein the estimating the communication channel condition comprises:
      deciding an address code of a wireless communication signal; and
      comparing the decided address code to a threshold;
   synchronizing the wireless communication by operating the wireless communication receiver in a frequency domain mode if the estimating estimates a first communication channel condition, the receiver operating in the frequency domain mode providing lower power consumption by the wireless communication receiver than operating the receiver in a time domain mode; and
   synchronizing a wireless communication by operating the wireless communication receiver in a time domain mode if the estimating estimates a second communication channel condition, the receiver operating in time domain mode providing better bit-error rate performance on user data portion than operating the receiver in the frequency domain mode.

2. The method as claimed in claim 1, wherein the threshold is a soft threshold.

3. The method as claimed in claim 2, wherein the soft threshold is of a value that is less than an ideal phase span of a received signal.

4. The method as claimed in claim 1, further comprising:
   replacing a received data with an assumed data if the comparing determines that the decided address code is less than the threshold.

5. A method for synchronizing a wireless communication receiver, comprising:
   estimating a communication channel condition for a wireless communication to be received by the wireless communication receiver, wherein the estimating the communication channel condition comprises:
      oversampling a received wireless communication signal;
      detecting a symbol rate of the oversampled received wireless communication signal; and
      processing the received wireless communication signal at the symbol rate;
   synchronizing the wireless communication by operating the wireless communication receiver in a frequency domain mode if the estimating estimates a first communication channel condition, the receiver operating in the frequency domain mode providing lower power consumption by the wireless communication receiver than operating the receiver in a time domain mode; and
   synchronizing a wireless communication by operating the wireless communication receiver in a time domain mode if the estimating estimates a second communication channel condition, the receiver operating in time domain mode providing better bit-error rate performance on user data portion than operating the receiver in the frequency domain mode.

6. The method as claimed in claim 5, wherein the detecting the symbol rate includes timing tracking by accumulating estimations of a symbol; and
   detecting a peak of accumulated estimations as a timing point of the symbol.

7. The method as claimed in claim 6, further comprising:
   operating the receiver using a timing signal based on the detected timing point when a system crystal timing signal of the receiver drifts.

8. A method for synchronizing a wireless communication receiver, comprising:
   estimating a communication channel condition for a wireless communication to be received by the wireless communication receiver, wherein the estimating the communication channel condition determines that no wireless communication signal that the receiver is capable of decoding is present, and
   terminating operation of at least a portion of the receiver upon determining that no signal that the receiver is capable of decoding is present;
   synchronizing a the wireless communication by operating the wireless communication receiver in a frequency domain mode it the estimating estimates a first communication channel condition, the receiver operating in the frequency domain mode providing lower power consumption by the wireless communication receiver than operating the receiver in a time domain mode; and
   synchronizing a wireless communication by operating the wireless communication receiver in a time domain mode if the estimating estimates a second communication channel condition, the receiver operating in time domain mode providing better bit-error rate performance on user data portion than operating the receiver in the frequency domain mode.

9. The method as claimed in claim 8, wherein the determination that no wireless communication signal that the receiver is capable of decoding is present includes:
accumulating estimates of symbol values;
determining that the accumulating estimates of symbol values have not converged to a value; and
indicating that no decodable signal is present based on the determination that the accumulated estimates have not converged to a value.

10. An apparatus for synchronizing a wireless communication receiver, comprising:
a synchronizer connected to receive data communicated via a wireless communication channel and operable to determine a channel condition of the wireless communication channel, wherein the synchronizer comprises:
an estimator connected to receive a received signal and operable to estimate a symbol of the received signal;
a time tracker connected to receive the estimated symbol from the estimator and operable to detect a peak of the estimated signal; and
a correlator connected to receive a peak from the time tracker and operable to decide on an address code and operable to compare a decided address code to a predetermined threshold, the correlator being operable to output a signal indicating a synchronization found if the decided address code meets the predetermined threshold;
a frequency domain demodulator connected to the synchronizer, the frequency domain demodulator being operable to decode the received data in a frequency domain operating mode;
a time domain demodulator connected to the synchronizer, the time domain demodulator being operable to decode the received data in a time domain operating mode;
the synchronizer controlling the frequency domain demodulator and the time domain demodulator to operate either the frequency domain demodulator or the time domain demodulator depending on the determined channel condition of the wireless communication channel.

11. The apparatus as claimed in claim 10, wherein the correlator includes a buffer of a length and a plurality of decision units of a number so as to simultaneously correlate all symbols of an entire address code.

12. The apparatus as claimed in claim 10, wherein the correlator include a plurality of registers and a plurality of decision units of a number so as to correlate symbols of an address code in segments.

13. The apparatus as claimed in claim 10, wherein the correlator is operable to replace an assumed code in place of a decided code if the predetermined threshold is met.

14. The apparatus as claimed in claim 10, wherein the estimator operates at an over sampling rate on the received data; and
wherein the correlator operates at a symbol rate based on the peak signal from the time tracker.

15. The apparatus as claimed in claim 10, wherein the time tracker operates to accumulate estimations of a symbol to obtain a peak of the accumulated estimations as the timing point of the symbol.

16. An apparatus for synchronizing a wireless communication receiver, comprising:
a synchronizer connected to receive data communicated via a wireless communication channel and operable to determine a channel condition of the wireless communication channel, wherein the synchronizer is operable to determine that no signal is being received that the receiver can decode and is connected to terminate at least one receiver function upon determining that no signal is being received that the receiver can decode;
a frequency domain demodulator connected to the synchronizer, the frequency domain demodulator being operable to decode the received data in a frequency domain operating mode;
a time domain demodulator connected to the synchronizer, the time domain demodulator being operable to decode the received data in a time domain operating mode; and
the synchronizer controlling the frequency domain demodulator and the time domain demodulator to operate either the frequency domain demodulator or the time domain demodulator depending on the determined channel condition of the wireless communication channel.

* * * * *